(12) United States Patent
Tian et al.

(10) Patent No.: US 8,760,746 B2
(45) Date of Patent: Jun. 24, 2014

(54) ELECTROWETTING DISPLAY

(75) Inventors: Xiaoxiong Tian, Beijing (CN); Jianshe Xue, Beijing (CN); Jisheng Zhao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 74 days.

(21) Appl. No.: 13/482,269

(22) Filed: May 29, 2012

(65) Prior Publication Data

US 2012/0307330 A1 Dec. 6, 2012

(30) Foreign Application Priority Data

Jun. 2, 2011 (CN) .......................... 2011 1 0147804

(51) Int. Cl.
*G02B 26/02* (2006.01)
(52) U.S. Cl.
USPC ........................................... 359/228
(58) Field of Classification Search
CPC ............................ G02B 26/004; G02B 26/005
USPC ................ 359/227, 228, 245, 253, 296, 665;
345/32, 41, 48, 49, 60, 84, 102, 105,
345/107, 204
See application file for complete search history.

(56) References Cited

U.S. PATENT DOCUMENTS 7,847,996 B2 * 12/2010 Chen et al. .................... 359/228
2007/0188676 A1 8/2007 Choi et al.
2009/0027317 A1 1/2009 Cheng et al.
2009/0027751 A1 1/2009 Chen et al.
2009/0040591 A1 2/2009 Cheng et al.
2009/0046231 A1 2/2009 Lu et al.
2009/0103159 A1 4/2009 Cheng et al.
2009/0168144 A1 7/2009 Lo et al.
2010/0033798 A1 2/2010 Wang et al.

FOREIGN PATENT DOCUMENTS

| CN | 1397831 A | 2/2003 |
| CN | 101355836 A | 1/2009 |
| CN | 101355838 A | 1/2009 |
| CN | 101363960 A | 2/2009 |
| CN | 101727783 A | 6/2010 |
| CN | 101750732 A | 6/2010 |
| KR | 10-2008-0071250 A | 8/2008 |
| TW | 200846804 A | 12/2008 |
| TW | 200907469 A | 2/2009 |
| TW | 200928430 A | 7/2009 |
| TW | 201007321 A | 2/2010 |

* cited by examiner

*Primary Examiner* — Euncha Cherry
(74) *Attorney, Agent, or Firm* — Ladas & Parry LLP

(57) ABSTRACT

An embodiment of the disclosed technology discloses an electrowetting display, comprising a first substrate, a second substrate disposed opposite to and under the first substrate, a plurality of separation walls, a first fluid, and a second fluid, wherein the plurality of separation walls are disposed in grid on the second substrate to define a plurality of pixel units, and the first fluid is filled in the spaces of the grid formed by adjacent separation walls, the first fluid is opaque and does not mix with the second fluid, the second fluid is transparent, has conductivity or polarity, and is filled between the first fluid and the first substrate; and wherein a colored layer is disposed for each pixel unit, and the colored layer has at least one predetermined color and is between the first fluid and the second substrate.

20 Claims, 5 Drawing Sheets

ELECTROWETTING DISPLAY

BACKGROUND

Embodiments of the disclosed technology relate to an electrowetting display.

The principle of the electrowetting display technology is related to electrowetting phenomenon or electrocapillary phenomenon, in which the free surface energy of a fluid can be changed when the fluid is subject to an influence of an electric field, so that the distribution area of the fluid in a pixel unit can be changed and thus a corresponding change can occur in the pixel unit to achieve a display effect. The electrowetting display technology has drawn a lot of attention due to its characteristics such as low power consumption, wide viewing angle and high response speed.

FIGS. 1A and 1B are schematic views of a typical conventional electrowetting display pixel unit. FIG. 1A shows the state without application of an operational voltage applied, in which a first fluid having a color forms a flat thin film layer 12 between a transparent polar fluid layer 11 and a waterproof insulating dielectric layer 13, and at this time, this display state of the pixel unit is at a dark state. FIG. 1B shows the state when an operational voltage is applied between an underlying electrode 14 and the polar fluid layer 11, in which the tensile force at the contact surface between the first fluid 12 and the dielectric layer 13 will change, and as a result, the original stationary state is no longer stable, so that the first fluid 12 is moved sideward to expose most portion of the pixel region (bottom), and at this time, a partially transparent pixel dot is formed and this display state of the pixel is at a bright state.

The change of the contact angle between fluids is a phenomenon that an electrolyte solution contracts or extends on another a fluid or substrate under the influence of an electric field. The electrowetting display technology uses the mechanism of electrowetting phenomenon, and displays by controlling an ink drop to extend or contract in pixel unit. The ink may have two functions:

1. a blocking function, generally applied for black-white display, in which the first fluid is black ink, and black color is displayed in a dark state and white color is displayed in a bright state.

2. a displaying function, generally applied for color display, in which the effect of color display is achieved by using the color of the first fluid itself.

Although the conventional electrowetting display technology has advantages, a very satisfying color display effect could not be achieved yet at present.

SUMMARY

One or more of technical problems to be solved by the disclosed technology is to provide an electrowetting display to achieve a full color display effect of the electrowetting display.

In one aspect of the disclosed technology, there is provided an electrowetting display, comprising: a first substrate, a second substrate disposed opposite to and under the first substrate, a plurality of separation walls, a first fluid, and a second fluid, wherein the plurality of separation walls are disposed in grid on the second substrate to define a plurality of pixel units, and the first fluid is filled in the spaces of the grid formed by adjacent separation walls, the first fluid is opaque and does not mix with the second fluid, the second fluid is transparent, has conductivity or polarity, and is filled between the first fluid and the first substrate; and wherein a colored layer is disposed for each pixel unit, and the colored layer has at least one predetermined color and is between the first fluid and the second substrate.

In one example, a colored layer is disposed for each pixel unit, the colored layer has a predetermined color, and the colored layer is provided between the first fluid and the second substrate.

In one example, a control circuit is disposed for each pixel unit respectively, and the control circuit is formed on the second substrate to control a voltage difference applied between the second fluid and the second substrate so as to control the first fluid to block or expose a predetermined region of the colored layer.

In one example, the colored layer of each pixel unit has only one color, the colors of the colored layers of the plurality of pixel units are arranged in a predetermined sequence of color arrangement; or the colored layer of each pixel unit comprises at least two regions having different colors.

In one example, a pixel electrode is disposed for each pixel unit, and the pixel electrode is connected with the control circuit and is between the first fluid and the second substrate.

In one example, when the colored layer comprises at least two regions having different colors, at least two pixel electrodes corresponding to various regions of the colored layer one by one are disposed for each pixel unit, the at least two pixel electrodes are between the first fluid and the second substrate, and are both connected with the control circuit, the pixel electrodes are electrically insulated from each other.

In one example, when the colored layer comprises at least two regions having different colors, a separation structure is further disposed for each pixel unit, and the separation structure is disposed on the second substrate and corresponds to borders between the regions of the colored layer, to divide the pixel unit into at least two sub-units, wherein each sub-unit respectively corresponds to the region having different color of the colored layer, and the first fluid in each sub-unit is separated from each other.

In one example, the pixel electrode is transparent electrode, the pixel electrode is located above or under the colored layer, and a backlight source is disposed under the second substrate.

In one example, the pixel electrode is reflective electrode, and the pixel electrode is located under the colored layer.

In one example, the colored layer does not penetrate light, and is disposed above the pixel electrode.

In one example, the above electrowetting display further comprises: a transparent common electrode and disposed on the first substrate, and the common electrode may be shared by a plurality of pixel units.

In one example, the pattern shape of the colored layer is in a shape of rectangle, square, circular, oval or triangle.

It can be seen from the above, in the embodiment of the electrowetting display provided by the disclosed technology, each pixel unit respectively comprises a colored layer, and the colored layer may comprise one or more than one color, thus when the first fluid blocks portion of the colored layer of a pixel unit, the display effect of the pixel unit will be determined by the color of the unblocked portion, so that each pixel can realize a particular color, and the goal of full color display is achieved.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

One or more embodiments of the disclosed technology provides an electrowetting display, in which each pixel unit may display two more kinds of colors so as to achieve the goal of full color electrowetting displaying. The following will give a further description on the disclosed technology by the detailed embodiment in combination with the figures.

Figure 1A:
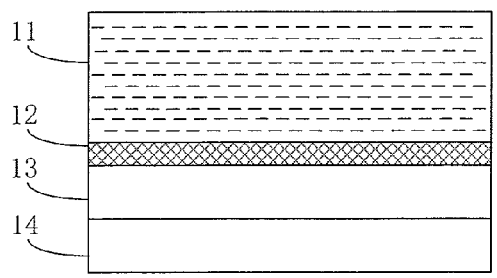
FIG. 1A is a displaying schematic view of a conventional electrowetting display pixel at a dark state.
Figure 1B:
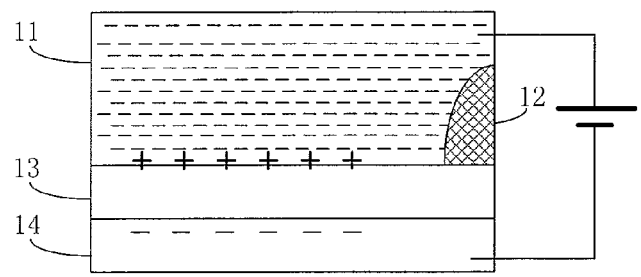
FIG. 1B is a displaying schematic view of the conventional electrowetting display pixel at a bright state.
Figure 2:
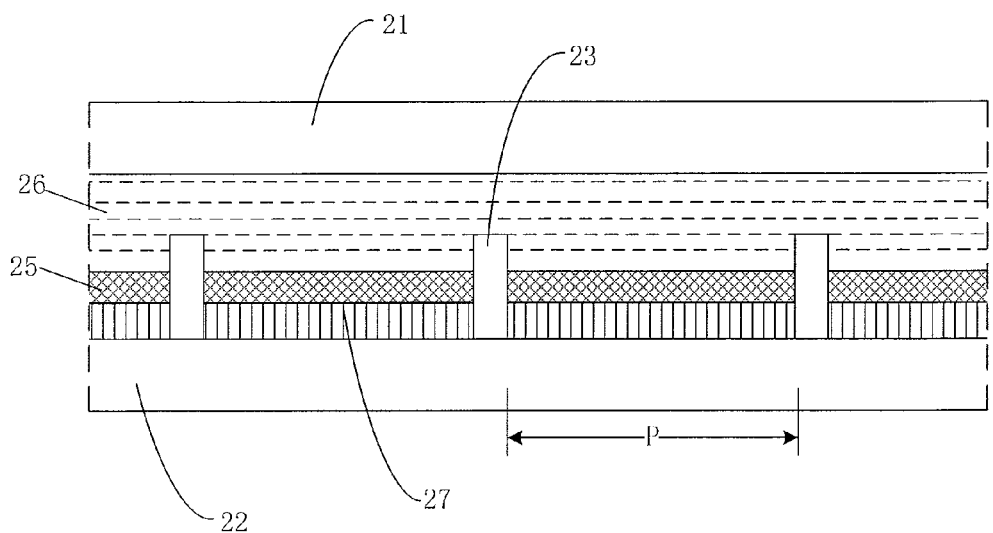
FIG. 2 is a sectional view of an electrowetting display of an embodiment of the disclosed technology.

Firstly, referring to FIG. 2, the electrowetting display of an embodiment of the disclosed technology comprises a first substrate 21, a second substrate 22 oppositely disposed under the first substrate 21, a plurality of separation walls 23 on the second substrate 22, a first fluid 25 and a second fluid 26. The first substrate 21 and the second substrate 22 may be glass substrates, plastic substrates, or the like. The separation walls 23 are formed in grid on the second substrate 22 so as to define a plurality of pixel units P. The first fluid 25 is filled in the space of each unit of the grid formed by the separation walls 23, and the first fluid 25 does not mix with the second fluid 26 due to different properties. The second fluid 26 is transparent for light and has conductivity or polarity, and is filled between the first fluid 25 and the first substrate 21 in a stable state. The first fluid 25 is a kind of opaque (light-tight) liquid substance (liquid), for example, ink, paraffin such as hexadecane or the like, and preferably, black ink may be used for the first fluid 25. The second fluid 26 may be conductive solution transparent for light, and for example, may be a kind of salt solution.

In one example of the present embodiment, a colored layer 27 is disposed respectively for each pixel unit. The colored layer 27 has a predetermined color, and is provided between the first fluid 25 and the second substrate 22.

It can be seen that, in the electro-wetting display of the present embodiment, each pixel unit P comprises the colored layer 27. Since the colored layer 27 can appear in a color or colors, when the first fluid 25 blocks a portion of the colored layer 27, the display effect of the pixel unit will be determined by the color of the unblocked portion, so that each pixel can realize a color effect and achieve the goal of full color display.

In the present embodiment, the colored layer 27 of each pixel unit may have only one color, and the arrangement of the colors of the colored layers of the plurality of pixel units may be an arrangement of colors with a predetermined sequence. For example, in a predetermined direction, colors of the colored layers of various pixel units are arranged repeatedly according to a predetermined sequence of red (R), green (G) and blue (B).

In another example of the present embodiment, the colored layer 27 of each pixel unit may comprise at least two regions in different colors. The shapes of the regions of each pixel unit may be identical or not, and the pattern constituted by the regions in each pixel unit may be a pattern in axial symmetry. For example, the regions having different colors of the colored layer 27 extend outward respectively from a point C (e.g., a central point) of the colored layer 27 and have a same shape and area. FIGS. 3A-3C and FIGS. 4A-4C are top views of the examples of the colored layer 27, respectively showing schematic views of two, three and four color regions. In these figures, C represents a point in the colored layer 27, the shadow filled region represents the first fluid 25, and the rectangle block constitutes the colored layer 27. It needs to be noted that, the first fluid 25 shown in FIGS. 3A-3C and FIGS. 4A-4C is only used to illustrate that the first fluid 25 is above the colored layer 27, but the shape of the first fluid 25 does not represent the detailed form of the first fluid 25 covering the colored layer 27.

Figure 3A:
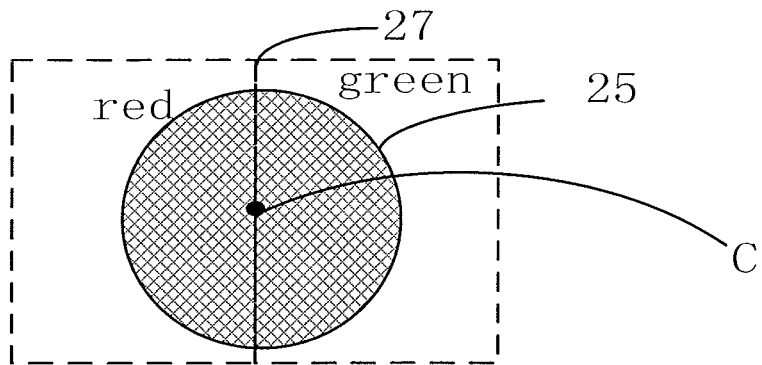
FIG. 3A is a top view of the colored layer having two color regions provided by an embodiment of the disclosed technology.
Figure 3B:
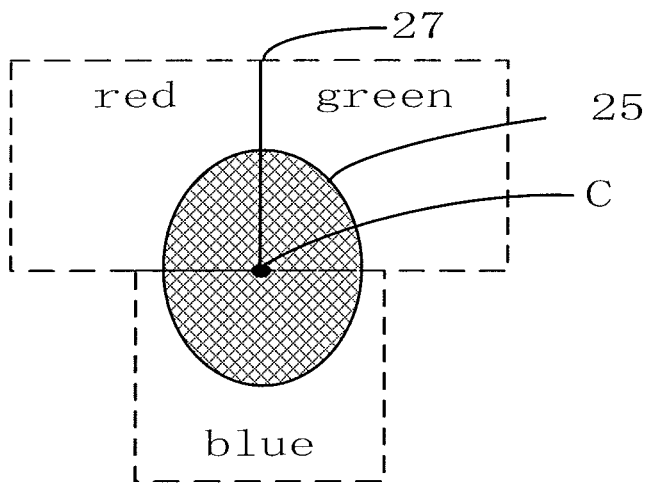
FIG. 3B is a top view of the colored layer having three color regions provided by an embodiment of the disclosed technology.
Figure 3C:
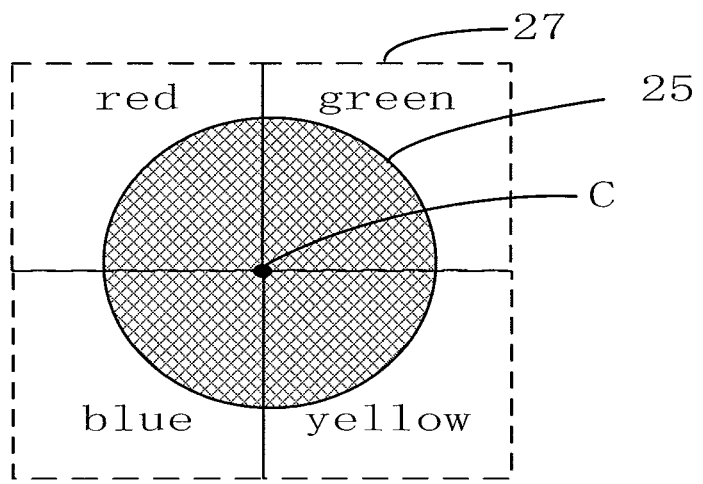
FIG. 3C is a top view of the colored layer having four color regions provided by an embodiment of the disclosed technology.
Figure 4A:
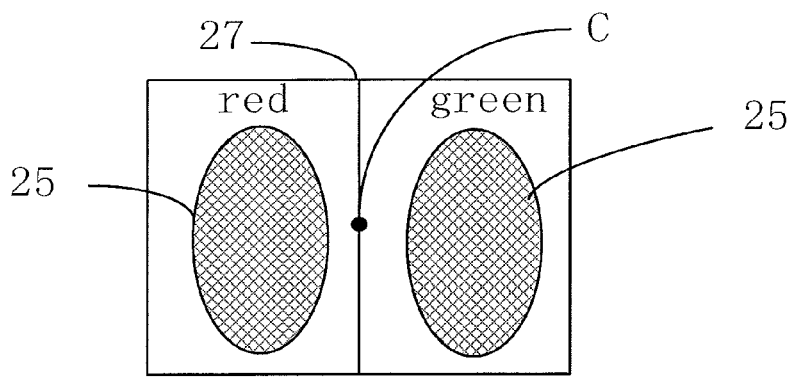
FIG. 4A is a top view of another colored layer having two color regions provided by an embodiment of the disclosed technology.
Figure 4B:
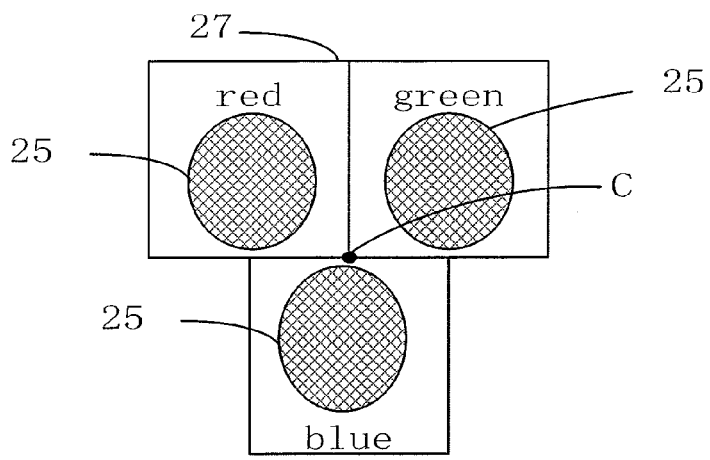
FIG. 4B is a top view of another colored layer having three color regions provided by an embodiment of the disclosed technology.
Figure 4C:
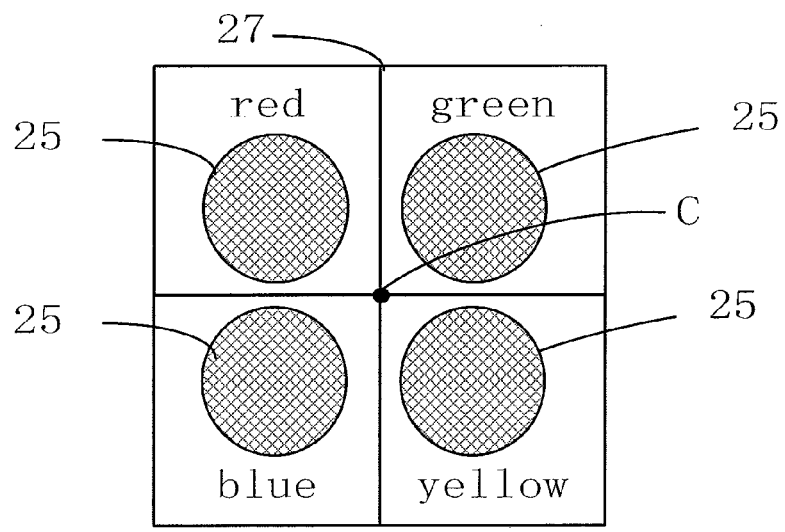
FIG. 4C is a top view of another colored layer having four color regions provided by an embodiment of the disclosed technology.

For example, in FIG. 3A and FIG. 4A, the colored layer 27 comprises two colors, that is, red and blue, each color occupying a half of the area of the colored layer; in another example, in FIG. 3B and FIG. 4B, the colored layer 27 comprises three colors, that is, red, green and blue, each color occupying ⅓ of the area of the colored layer; in still another example, in FIG. 3C and FIG. 4C, the colored layer 27 comprises four colors, that is, red, green, blue and yellow, each color occupying ¼ of the area of the colored layer. Of course, the colored layer 27 of the disclosed technology is not limited to the combination of the above several colors. The color display effect of each pixel unit can be achieved by the first fluid 25 blocking or exposing a certain region or regions in predetermined color or colors of the colored layer 27.

The pixel units in the pixel array can be arranged in any suitable configuration such as that as shown in FIG. 4B or 4C.

The following will give a further description to several embodiments of the disclosed technology.

Figure 5:
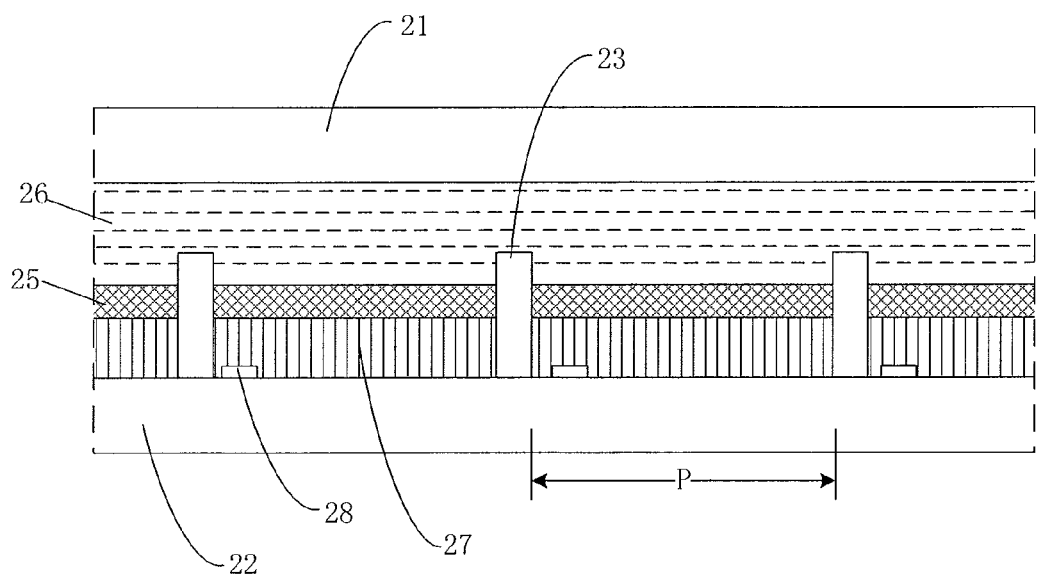
FIG. 5 is a sectional schematic view of another electrowetting display of an embodiment of the disclosed technology.

Referring to FIG. 5, a control circuit 28 is further disposed for each pixel unit P on the basis of the embodiment shown in FIG. 2. The control circuit 28 can be formed on the second substrate 22, to control a voltage difference applied between the second fluid 26 and the second substrate 22, so as to control the first fluid 25 to block or expose predetermined region or regions of the colored layer 27 and thus achieve a color display effect.

Figure 6:
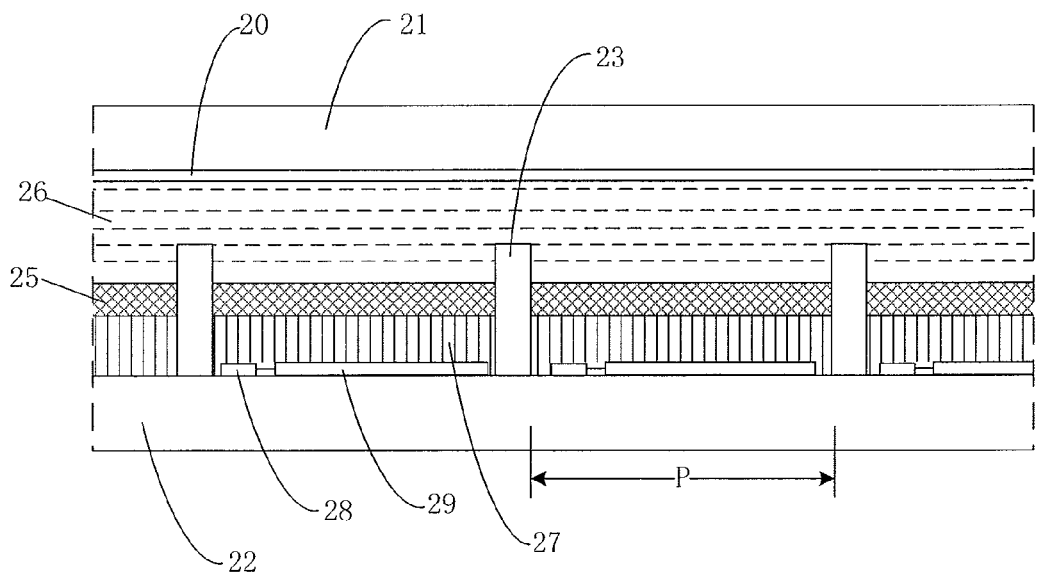
FIG. 6 is a sectional schematic view of another electrowetting display of an embodiment of the disclosed technology.
Figure 7:
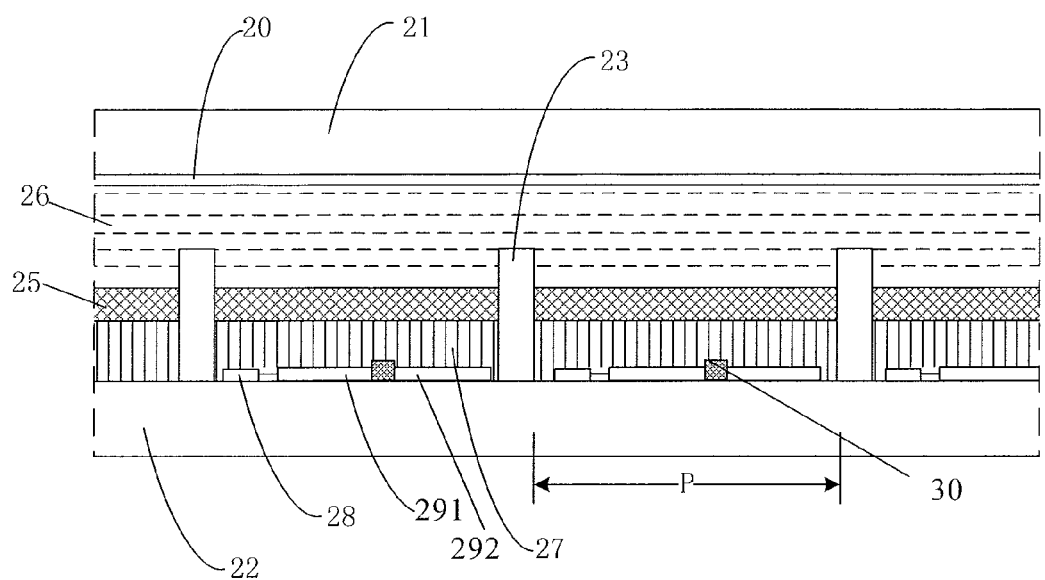
FIG. 7 is a sectional schematic view of another electrowetting display of an embodiment of the disclosed technology.

Referring to FIG. 6, a pixel electrode 29 is further disposed for each pixel unit on the basis of the embodiment shown in FIG. 5. The pixel electrode 29 is connected with the control circuit 28, and is between the first fluid 25 and the second substrate 22. The control circuit 28 controls the voltage inputted to the pixel electrode 29, so as to control voltage difference applied between the second fluid 26 and the second substrate 22 within each pixel unit P, so as to block or expose the predetermined color region or regions of the colored layer 27 and thus achieve a color display effect.

In FIG. 6, a common electrode 20 may be further disposed on the first substrate 21 to completely cover the first substrate 21. All or a portion of the pixel units P share the common electrode 20, thus the control circuit 28 may apply a control voltage between the common electrode 20 and the pixel electrode 29, to control the voltage difference between the second fluid 26 and the second substrate 22 so as to control the first fluid 25 to block or expose the region or regions having predetermined color or colors of the colored layer in each pixel unit.

The colored layer 27 in FIG. 6 may comprise only one color, and may also comprise two or more colors. In FIG. 6, when the colored layer 27 comprises at least two regions having different colors, since only one pixel electrode 29 is disposed for each pixel unit P, all of the color regions of the colored layer 27 of the pixel unit correspond to (share) this pixel electrode. Thus, preferably, the pixel electrode 29 is disposed corresponding to the center of the color regions of the pixel unit. For example, the projection point of the center point C of the colored layer 27 on the pixel electrode 29 is overlapped with the center point of the pixel electrode 29.

Referring to FIGS. 3A-3C, when the colored layer 27 comprises at least two regions having different colors and only one pixel electrode 29 is disposed for each pixel unit P, the regions having different colors of the colored layer within each pixel unit correspond to the same first fluid 25 in the pixel unit, that is, the blocking of both the color regions of the colored layer 27 is achieved by using the same first fluid 25.

Another embodiment of the disclosed technology is different from that as shown in FIG. 6 in that, when the colored layer 27 comprises at least two regions having different colors, at least two pixel electrodes may be disposed for each pixel unit P and corresponding to the regions having different colors of the colored layer 27 for example in a one-by-one manner, the at least two pixel electrodes 291, 292 are between the first fluid and the second substrate, the pixel electrodes 291, 292 are electrically insulated from each other and are all connected with the control circuit 28. At this time, a separation structure 30 may be formed for each pixel unit P. The separation structure 30 is disposed on the second substrate 22 and corresponds to borders between the regions of the colored layer 27, to divide the pixel unit P into at least two sub-units, of which each sub-unit respectively corresponds to one of the regions having different colors of the colored layer 27, and the first fluid in each sub-unit are separated from each other.

Referring to FIGS. 4A-4C, when the colored layer 27 comprises at least two regions having different colors and the different color regions of the colored layer 27 correspond to at least two pixel electrode one by one, the different color regions of the colored layer 27 within each pixel unit respectively corresponds to the first fluid 25 separated from each other, that is, the blocking of each color region of the colored layer 27 can be achieved by using the independent first fluid 25.

In the one or more embodiments of the disclosed technology, the control circuit 28 may comprise a switching element, which for example may be a thin film transistor (TFT), to control the voltage input to the pixel electrode 29. When at least two pixel electrodes are disposed for each pixel unit, the control circuit 28 may comprise at least two switching elements, respectively corresponding to the at least two pixel electrodes one by one. Of course, by considering manufacturing complication and pixel aperture ratio, the number of the switching elements disposed for each pixel unit in the present embodiment may be less than that of the color regions of the colored layer of the pixel unit.

In an example, the pixel electrode 29 in the present embodiment may be a transparent electrode made by a transparent conductive material such as indium tin oxide (ITO) or indium zinc oxide (IZO). Then the pixel electrode 29 may be above or under the colored layer 27, although the pixel electrodes 29 as shown in FIGS. 2, 5 and 6 are under the colored layer 27. For example, when the pixel electrode 29 is provided under the colored layer 27, the incident light from the bottom of the second substrate 22 pass through the pixel electrode 29 and reach the colored layer 27, then is color-filtered by the colored layer 27, next emit from the colored layer 27 not covered by the first fluid 25 and the second fluid 26, so as to make the pixel unit to display corresponding color. For another example, when the pixel electrode 29 is provided above the colored layer 27, the pixel electrode 29 may be covered by an insulation layer, and the incident light from the bottom of the second substrate 22 firstly reach the colored layer 27, is filtered by the colored layer 27, and then emits through the pixel electrode 29, the insulation layer not covered by the first fluid 25, and the second fluid 26, also causing the pixel unit display corresponding color. When the pixel electrode is a transparent electrode, the electro-wetting display may further comprise a backlight disposed under the second substrate 22 to generate the light for display.

In one example of the present embodiment, the pixel electrode 29 may be a reflective electrode, and it may be made by a metal such as silver, platinum, chromium, molybdenum and their alloy. At this time, the pixel electrode 29 may be provided under the colored layer 27. In this case, the light incident from the first substrate 21 subsequently passes through the second fluid 26 and reaches the colored layer 27 not covered by the first fluid 25, is filtered by the colored layer 27 and next reflected by the pixel electrode 29 to emit out after sequentially passing through the colored layer 27 not covered by the first fluid 25, the second fluid 26, and the first substrate 21, thereby the pixel can display corresponding color.

For example, the present embodiment may dispose a lightproof colored layer 27, the colored layer 27 is provided above the pixel electrode and can directly reflect the light incident from the first substrate 21 by the colored layer 27 without using a reflective pixel electrode 29, that is, the light incident from the first substrate 21 sequentially pass through the second fluid 26 and reach the colored layer 27 not covered by the first fluid 25, filtered at the colored layer 27 and reflected as well, then emits out after passing through the second fluid 26 and the first substrate 21, thereby the pixel can display corresponding color.

The electrowetting displays provided by the embodiments of the disclosed technology can make the pixel unit to display more than one color, and achieve the goal of full color display in the electrowetting display technology.

The above are only embodiments of the disclosed technology. It should be noted that, those with ordinary skills in the art may make various changes and modifications, without departing the principle of the disclosed technology. Such changes and modifications should also be considered to be within the protection scope of the disclosed technology.

What is claimed is:

1. An electrowetting display, comprising:
a first substrate,
a second substrate disposed opposite to and under the first substrate,
a plurality of separation walls,
a first fluid, and
a second fluid,
wherein the plurality of separation walls are disposed in grid on the second substrate to define a plurality of pixel units, and the first fluid is filled in the spaces of the grid formed by adjacent separation walls, the first fluid is opaque and does not mix with the second fluid, the second fluid is transparent, has conductivity or polarity, and is filled between the first fluid and the first substrate; and
wherein a colored layer is disposed for each pixel unit, and the colored layer has predetermined colors and is between the first fluid and the second substrate;
wherein a control circuit is disposed for each pixel unit respectively, and the control circuit is formed on the second substrate to control a voltage difference applied between the second fluid and the second substrate for each pixel unit, so as to control the first fluid to block or expose a predetermined region of the colored layer;
wherein the colored layer of each pixel unit comprises at least two regions having different colors; and
at least two pixel electrodes corresponding to the regions of the colored layer one by one are disposed for each pixel unit, and the at least two pixel electrodes are provided between the first fluid and the second substrate and are both connected with the control circuit, the pixel electrodes are electrically insulated from each other.

2. The electrowetting display according to claim 1, wherein a separation structure is further disposed for each pixel unit, the separation structure is corresponding to the borders between the regions of the colored layer and disposed on the second substrate, dividing the pixel unit into at least two sub-units, wherein each sub-unit respectively corresponds to the region having a different color of the colored layer, and the first fluid in each sub-unit is separated from each other.

3. The electrowetting display according to claim 1, wherein each of the pixel electrodes is a transparent electrode, is located above or under the colored layer, and a backlight source is disposed under the second substrate.

4. The electrowetting display according to claim 1, wherein each of the pixel electrodes is a reflective electrode and is located under the colored layer.

5. The electrowetting display according to claim 1, wherein the colored layer of each pixel unit is not transparent and is disposed above the pixel electrode.

6. The electrowetting display according to claim 1, further comprising a transparent common electrode, which is disposed on the first substrate.

7. The electrowetting display according to claim 6, wherein the transparent common electrode is shared by all or a plurality of pixel units.

8. The electrowetting display according to claim 1, wherein the pattern shape of the colored layer is in a shape of rectangle, square, circular, oval or triangle.

9. An electrowetting display, comprising:
a first substrate,
a second substrate disposed opposite to and under the first substrate,
a plurality of separation walls,
a first fluid, and
a second fluid,
wherein the plurality of separation walls are disposed in grid on the second substrate to define a plurality of pixel units, and the first fluid is filled in the spaces of the grid formed by adjacent separation walls, the first fluid is opaque and does not mix with the second fluid, the second fluid is transparent, has conductivity or polarity, and is filled between the first fluid and the first substrate; and
a transparent common electrode disposed on the first substrate;
wherein a colored layer is disposed for each pixel unit, and the colored layer has at least one predetermined color and is between the first fluid and the second substrate.

10. The electrowetting display according to claim 9, wherein a control circuit is disposed for each pixel unit respectively, and the control circuit is formed on the second substrate to control a voltage difference applied between the second fluid and the second substrate for each pixel unit, so as to control the first fluid to block or expose a predetermined region of the colored layer.

11. The electrowetting display according to claim 10, wherein the colored layer of each pixel unit has only one color, and the colors of the colored layers of the plurality of pixel units are arranged in a predetermined sequence of color arrangement; or
the colored layer of each pixel unit comprises at least two regions having different colors.

12. The electrowetting display according to claim 10, wherein a pixel electrode is disposed for each pixel unit, and the pixel electrode is connected with the control circuit and is between the first fluid and the second substrate.

13. The electrowetting display according to claim 11, wherein, when the colored layer comprises at least two regions having different colors, at least two pixel electrodes corresponding to the regions of the colored layer one by one are disposed for each pixel unit, and the at least two pixel electrodes are provided between the first fluid and the second substrate and are both connected with the control circuit, the pixel electrodes are electrically insulated from each other.

14. The electrowetting display according to claim 11, wherein when the colored layer comprises at least two regions having different colors, a separation structure is further disposed for each pixel unit, the separation structure is corresponding to the borders between the regions of the colored layer and disposed on the second substrate, dividing the pixel unit into at least two sub-units, wherein each sub-unit respectively corresponds to the region having a color of the colored layer, and the first fluid in each sub-unit is separated from each other.

15. The electrowetting display according to claim 12, wherein each of the pixel electrodes is a transparent electrode, is located above or under the colored layer, and a backlight source is disposed under the second substrate.

16. The electrowetting display according to claim 13, wherein each of the pixel electrodes is a transparent electrode, is located above or under the colored layer, and a backlight source is disposed under the second substrate.

17. The electrowetting display according to claim 12, wherein each of the pixel electrodes is a reflective electrode and is located under the colored layer.

18. The electrowetting display according to claim 12, wherein the colored layer of each pixel unit is not transparent and is disposed above the pixel electrode.

19. The electrowetting display according to claim 9, wherein the transparent common electrode is shared by a plurality of pixel units.

20. The electrowetting display according to claim 9, wherein the pattern shape of the colored layer is in a shape of rectangle, square, circular, oval or triangle.

\* \* \* \* \*